United States Patent [19]

Saxena et al.

[11] Patent Number: 6,091,431
[45] Date of Patent: Jul. 18, 2000

[54] METHOD AND APPARATUS FOR IMPROVING PROCESSOR TO GRAPHICS DEVICE LOCAL MEMORY PERFORMANCE

[75] Inventors: Alankar Saxena, Folsom; Aditya Sreenvas, Eldorado Hills; Kim A. Meinerth, Granite Bay, all of Calif.

[73] Assignee: Intel Corporation, Santa Clara, Calif.

[21] Appl. No.: 08/993,689

[22] Filed: Dec. 18, 1997

[51] Int. Cl.[7] .................................................. G06F 13/16
[52] U.S. Cl. ........................ 345/521; 345/525; 710/131; 710/38
[58] Field of Search ..................... 345/501–504, 345/520, 521, 525, 526, 507, 509, 512, 518; 395/287, 293, 294, 309, 311, 848, 856, 858, 860, 728, 732; 710/131, 240, 244, 36, 38

[56] References Cited

U.S. PATENT DOCUMENTS

| | | | |
|---|---|---|---|
| 5,218,674 | 6/1993 | Peaslee et al. | 345/525 |
| 5,276,798 | 1/1994 | Peaslee et al. | 345/505 |
| 5,522,061 | 5/1996 | Burgoon et al. | 711/169 |
| 5,657,055 | 8/1997 | Kansal et al. | 345/509 |
| 5,689,656 | 11/1997 | Baden et al. | 395/296 |
| 5,706,034 | 1/1998 | Katsura et al. | 345/508 |
| 5,767,866 | 6/1998 | Chee et al. | 345/521 |
| 5,815,167 | 9/1998 | Muthal et al. | 345/512 |
| 5,818,464 | 10/1998 | Wade | 345/501 |
| 5,838,955 | 11/1998 | Childers et al. | 345/507 |
| 5,854,638 | 12/1998 | Tung | 345/512 |
| 5,877,741 | 3/1999 | Chee et al. | 345/513 |
| 5,892,964 | 4/1999 | Horan et al. | 712/33 |
| 6,000,001 | 12/1999 | Larson | 710/244 |

Primary Examiner—Ulka J. Chauhan
Attorney, Agent, or Firm—Calvin E. Wells

[57] ABSTRACT

A graphics device implemented in accordance with one embodiment of the invention includes a first request path to a local memory interface for low-priority read transactions and a second request path to the local memory interface for low-priority write transactions. The second request path is also used for read transactions received over a system bus. The graphics device further includes an arbiter that arbitrates between the first request path and the second request path, with the second request path having a higher priority than the first request path.

17 Claims, 4 Drawing Sheets

METHOD AND APPARATUS FOR IMPROVING PROCESSOR TO GRAPHICS DEVICE LOCAL MEMORY PERFORMANCE

BACKGROUND OF THE INVENTION

1. Field of the Invention

The present invention pertains to the field of computer graphics devices. More particularly, this invention pertains to the field of improving processor to graphics device local memory performance.

2. Background of the Related Art

Computer systems perform a variety of functions including data acquisition, data processing, and display of graphical or video images. The images displayed to the user can take many forms. For example, it may be useful to display information in terms of alphanumeric characters, graphical images, or even full motion video. In any of these forms, the user seeks to maximize the quantity and quality of information that is output to the display, as well as maximizing the speed at which the information is displayed. Many of today's applications, including 3D games, video conferencing, and movie playback, place large strains on computing and display resources. These computing and display resources may include a microprocessor, a system memory, a graphics device, a local memory for the graphics device, and a system bus for interconnecting the processor, system memory, and graphics device. Images are output from the graphics device to a display monitor for display.

As mentioned above, a local memory is generally implemented in conjunction with a graphics device in a computer system. The local memory may be referred to as a frame buffer. The local memory contains pixels in a digitized form for display on the corresponding display monitor. The pixel data is arranged in the frame in rows and columns that correspond to rows and columns on the display monitor. To display a graphical image on a display monitor, the pixel data is transferred from the local memory and converted to an analog signal by a digital to analog converter (DAC) within the graphics device.

In order to process and prepare images for display, the processor, as well as the graphics device, must access the local memory. The speed at which the processor is able to retrieve information from or store information to the local memory directly effects the quality of displayed images as well as the speed at which the images are displayed. In a typical implementation, the processor's path to the frame buffer is through the graphics device. The processor is typically able to communicate with the graphics device with relatively little latency and with reasonable bandwidth. However, when the processor must access the frame buffer, the latency increases greatly and the bandwidth is severely reduced. This increase in latency and reduction in bandwidth is due to the large latency that is introduced by the path through the graphics device. One reason for the large latency that is introduced by the path through the graphics device is that the processor must compete for access to the frame buffer with several functional units within the graphics device, including, but not limited to, rendering engines, blitter engines, and display engines. In general, and as well known in the art, rendering engines process images, blitter engines move image data from unit to unit and between system memory and local memory, and display engines output the processed and prepared images for display on a display monitor.

Previous graphics devices have assigned a low priority to processor accesses to the local memory. The several units in the graphics device are assigned priorities equal to or greater than the processor for accesses to the local memory. This results in poor processor to local memory performance, and this in turn adversely effects graphics performance. Therefore, a method and apparatus for improving processor to graphics device local memory performance is desirable.

SUMMARY OF THE INVENTION

A method and apparatus for improving processor to graphics device local memory performance is disclosed. A graphics implemented in accordance with one embodiment of the invention includes a first request path to a local memory interface for low-priority read transactions and a second request path to the local memory interface for low-priority write transactions. The second request path is also used for read transactions received over a system bus. The graphics device further includes an arbiter that arbitrates between the first request path and the second request path, with the second request path having a higher priority than the first request path.

DETAILED DESCRIPTION

A method and apparatus for improving processor to graphics device local memory performance is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of improving processor to graphics device local memory performance. In general, and in accordance with one embodiment of the invention, low-priority read transaction requests for access to a graphics device local memory are received by a low-priority read request path that includes a first-in, first out buffer (FIFO). These low-priority read transaction requests are typically generated by units internal to the graphics device, such as drawing and blitting engines. Read requests that are received over a system bus and low-priority write transaction requests are received by a low-priority write request and system bus read request path, also including a FIFO. The read requests that are received over the system bus are typically generated by a processor, and the low-priority write requests are typically generated by units internal to the graphics device, such as drawing and blitting engines. The low-priority write transaction requests may also be generated by the processor and received over the system bus. An arbitration mechanism arbitrates between the low-priority read request path and the low-priority write request and system bus read request path. The low-priority write request and system bus read request path is assigned a higher priority than the low-priority read request path. Therefore, read requests that are received over the system bus are granted higher priority to access the local memory than low-priority read requests generated by units internal to the graphics device. This serves to improve processor to graphics device local memory performance by reducing the latency between the system bus and the local memory.

EMBODIMENTS OF THE INVENTION

Figure 1:
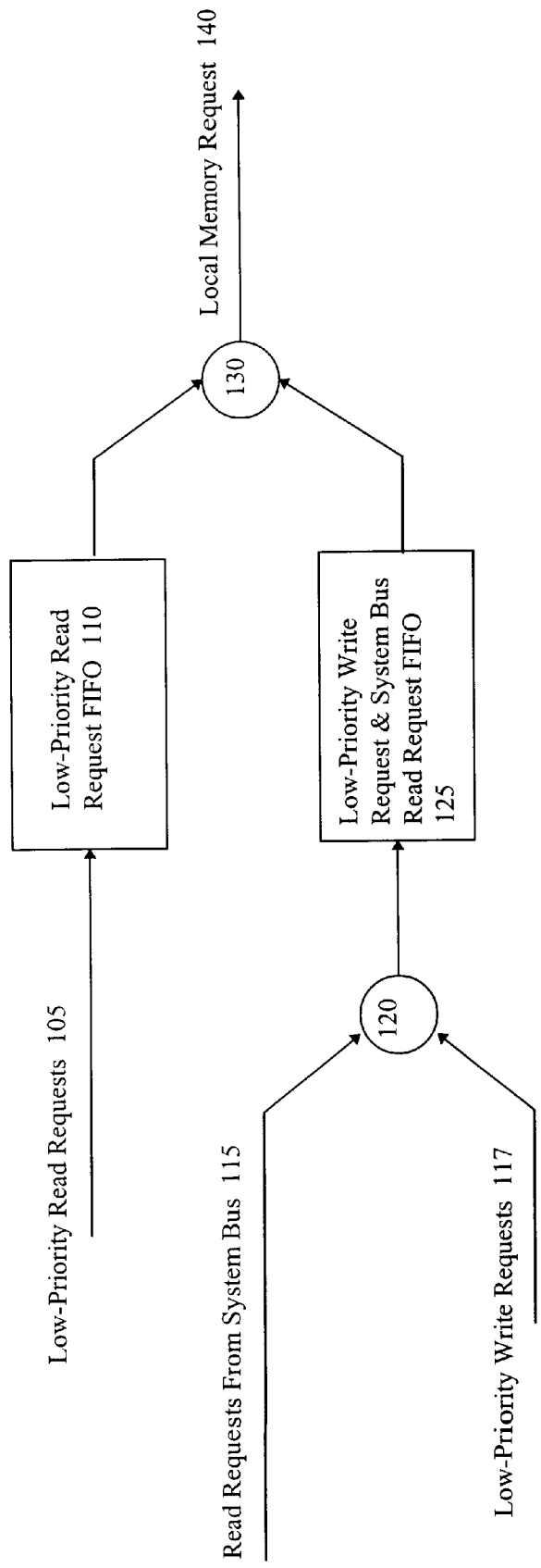

FIG. 1 shows a block diagram of a low-priority read request path and a low-priority write request and system bus read request path implemented in accordance with one embodiment of the invention. The low-priority read request path and the low-priority write request and system bus read request path are implemented in a graphics device and serve to provide access to a local memory coupled to the graphics device. The low-priority read request path may include a low-priority read request FIFO 110. The low-priority read request FIFO 110 receives low-priority read requests 105. The low-priority read requests 105 may be generated by any functional units that do not require immediate access to the local memory. Such functional units may include, but are not limited to, rendering engines and blitting engines.

Low-priority write requests 117 are received by the low-priority write request and system bus read request path, which may include a low-priority write request and system bus read request FIFO 125. The low-priority write requests may be generated by any functional units that do not need to immediately deliver information to the local memory. Such functional units may include, but are not limited to, rendering engines and blitting engines. Low-priority write requests also include write requests that are delivered to the graphics device over a system bus. Write requests delivered over the system bus include write requests generated by a processor.

Read requests that are delivered to the graphics device over the system bus 115 are also received by the low-priority write request and system bus read request FIFO 125. Read requests that are delivered over the system bus 115 include read requests generated by the processor. If a read request from the system bus 115 and a low-priority write request 117 are received concurrently, a read request from system bus and low-priority write request arbitration unit 120 arbitrates between the read request from the system bus 115 and the low-priority write request 117 in order to decide which request is to be received by the low-priority write request and system bus read request FIFO 125 first. Any arbitration or priority scheme may be employed by the read request from system bus and low-priority write request arbitration unit 120, including fixed or rotating priority schemes.

A local memory request arbitration unit 130 arbitrates between the FIFOs 110 and 125 for access to the local memory via a local memory request 140. Transaction requests exiting the low-priority write request and system bus read request FIFO 125 are granted a higher priority than transaction requests exiting the low-priority read request FIFO 110. In this manner, read requests from the system bus 115 are granted higher priority to access the local memory than low-priority read requests generated by units internal to the graphics device. This serves to improve processor to graphics device local memory performance by reducing the latency between the system bus and the local memory.

In the present embodiment, both read and write requests from the system bus are received by the low-priority write request and system bus read request FIFO 125. This arrangement forces a natural ordering between the reads and writes received over the system bus, thereby maintaining data coherency (ordering of reads and writes). It is possible to provide separate FIFO for reads and writes received over the system bus, but additional logic is required in order to maintain data coherency between the separate FIFOs.

Figure 2:
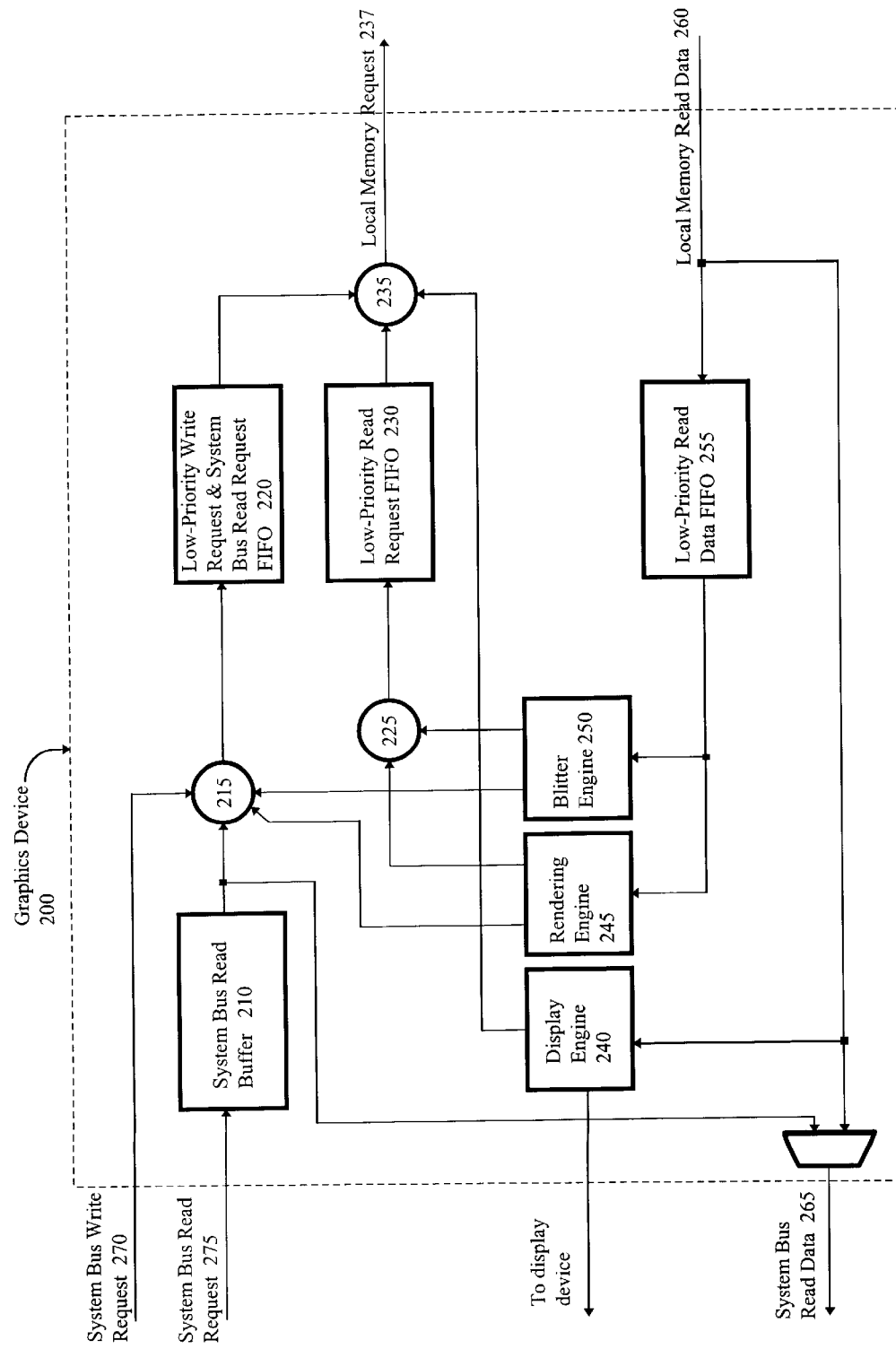

FIG. 2 depicts a graphics device 200 implemented in accordance with one embodiment of the invention. The graphics device receives system bus write requests 270 and system bus read requests 275 over a system bus (not shown). The system bus read and write requests 270 and 275 are typically generated by a processor (not shown) and are targeted to a local memory (not shown) coupled to the graphics device 200 via a local memory request path 237 and a local memory read data path 260. The graphics device 200 returns data from the local memory to the system bus via a system bus read data path 265. The graphics device 200 further includes a system bus read buffer 210, a low-priority write request and system bus read request FIFO 220, a low-priority write request and system bus read request arbitration unit 215, a low-priority read request FIFO 230, a low-priority read request arbitration unit 225, a local memory request arbitration unit 235, a display engine 240, a rendering engine 245, a blitter engine 250, and a low-priority read data FIFO 255. The low-priority read data FIFO 255 temporarily stores read data returned by the local memory and destined for the rendering engine 245 or the blitter engine 250.

The display engine 240 is intended to represent a broad range of well-known display engines. Also, the rendering engine 245 is intended to represent a broad range of well-known rendering or drawing engines. Further, the blitter engine 250 is intended to represent a broad range of well-known blitter engines.

The low-priority write request and system bus read request arbitration unit 215 and the low-priority read request arbitration unit 225 are also intended to represent a broad range of arbitration devices or methods. Priority schemes used by the arbitration units 215 and 225 may include fixed or rotating priority schemes.

Although the low-priority write request and system bus read request FIFO 220 and the low-priority read request FIFO 230 are used in the present example embodiment to provide transaction request paths by providing temporary storage of transaction requests, any device or method for temporarily storing transaction requests may be used to practice the invention. Further, any device or method for temporarily storing data may be used to practice the invention rather that the low-priority read data FIFO 255 discussed in connection with the present example embodiment.

The system bus read requests 275 are received by the system bus read buffer 210. If the appropriate data has been previously fetched from the local memory and is currently stored in the system bus read buffer 210, the system bus read request 275 is satisfied by causing the appropriate data to be delivered from the system bus read buffer 210 to the system bus read data path 265. If the appropriate data is not currently stored in the system bus read buffer 210, the data must be fetched from the local memory. This is accomplished by forwarding the system bus read request 275 to the low-priority write request and system bus read request FIFO 220. The low-priority write request and system bus read request FIFO 220 functions in the same manner as the low-priority write request and system bus read request FIFO 125 as discussed above in connection with FIG. 1.

Once the system bus read request 275 exits the low-priority write request and system bus read request FIFO 220, the system bus read request 275 is forwarded to the local memory via the local memory request path 237. The local memory responds to the system bus read request 275 by returning the requested data via the local memory read data path 260 to the system bus read data path 265, and from there to the system bus.

In addition to delivering the requested data to the system bus, the local memory returns a block of data located adjacent to the requested data to the system bus read buffer 210. This pre-fetching of the adjacent block of data increases the likelihood that future system bus read requests will find the appropriate data in the system bus read buffer 210, thereby improving system bus read performance by eliminating the need to perform an access to local memory.

As an example of system bus read data being pre-fetched from the local memory in order to improve system bus read performance, consider a processor that generates a read request transaction for an entire cache line of data. The cache line size for this example is 32 bytes (4 quad-words), and a series of 8 sequential read requests are transmitted over the system bus with each read transaction requesting 4 bytes (1 double-word) of data from the local memory. The sequential read requests may be either ascending or descending. For ascending sequential read requests, the read request for $0^{th}$ double-word of the cache line reaches the system bus read buffer 210 first. Assuming that the requested data is not presently located in the system bus read buffer 210, the read request for the $0^{th}$ double-word of the cache line causes 32 bytes of data to be fetched from the local memory and placed in the system bus read buffer 210. The system bus read buffer 210 for this example may store up to 4 cache lines. The pre-fetched 32 bytes of data include the requested data for the $0^{th}$ double-word of the cache line and the next seven adjacent and ascending double-words. The requested data for the $0^{th}$ double-word of the cache line is also delivered to the system bus via the system bus read data path 265.

Once the entire 32 bytes of read data corresponding to the cache line are stored in the system bus read buffer 210, the read requests from the processor requesting data corresponding to the $1^{st}$ through $7^{th}$ double-words of the cache line are serviced from the system bus read buffer 210. This saves the time it would otherwise take to retrieve each double-word separately from the local memory, thereby significantly improving processor to local memory read performance.

Although the discussion above with respect to the system bus read buffer 210 mentions specific transaction types and data sizes for purposes of example, the invention may be practiced with a wide range of types and sizes and is not limited to the specific types and sizes mentioned. Further, the system bus read buffer 210 may be implemented as any device or method for storing information.

The system bus write requests 270 are received by the low-priority write request and system bus read request arbitration unit 215. The low-priority write request and system bus read request arbitration unit 215 arbitrates for access to the low-priority write request and system bus read request FIFO 220. A broad range of well-known arbitration devices or methods may be used to implement the low-priority write request and system bus read request arbitration unit 215. In addition to write transaction requests received over the system bus, the low-priority write request and system bus read request arbitration unit 215 also arbitrates between low-priority write requests generated by the rendering engine 245 and the blitter engine 250 as well as read requests received over the system bus which are not serviced out of the system bus read buffer 210, as described above.

In the present embodiment, both read and write requests from the system bus are received by the low-priority write request and system bus read request FIFO 220. As described above in connection with FIG. 1, this arrangement forces a natural ordering between the reads and writes received over the system bus, thereby maintaining data coherency. It is possible to provide separate FIFO for reads and writes received over the system bus, but additional logic is required in order to maintain data coherency between the separate FIFOs.

Write requests received over the system bus may be packetized before forwarding the requests to the local memory. For example, two sequential double-word write transactions received over the system bus may be combined into a single quad-word write to local memory.

Low-priority read requests generated by the rendering engine 245 and the blitter engine 250 are received by the low-priority read request arbitration unit 225. The low-priority read request arbitration unit 225 arbitrates for access to the low-priority read request FIFO 230. A broad range of well-known arbitration devices or methods may be used to implement the low-priority read request arbitration unit 225.

The local memory request arbitration unit 235 arbitrates for access to the local memory. The local memory request arbitration unit 235 arbitrates between transaction requests exiting the low-priority write request and system bus read request FIFO 220, transaction requests exiting the low-priority read request FIFO 230, and high-priority transactions generated by the display engine 240. The requests generated by the display engine 240 are assigned the highest priority because the display engine 240 must be able to retrieve information from the local memory without undue delay. The display engine 240 must cause a display monitor to refresh many times each second, and if the display engine 240 is denied quick access to the local memory in order to retrieve display information, display quality will visibly suffer. Information returned by the local memory is delivered to the display engine 240 via the local memory read data path 260, which is a low-latency path.

Transaction requests exiting the low-priority write request and system bus read request FIFO 220 are assigned the next-highest priority by the local memory request arbitration unit 235, while transaction requests exiting the low-priority read request FIFO 230 are assigned the lowest priority. These priority relationships ensure that read transactions received over the system bus are granted higher priority than low-priority read requests generated by functional units internal to the graphics device 200. Since the processor accesses the graphics device 200 and the local memory via the system bus, processor to local memory performance is improved. Processor to local memory performance is further improved by delivering read data from the local memory to the system bus via the local memory read data path 260, which is a low-latency path, while low-priority read data destined for internal units passes through the low-priority read data FIFO 255.

The above-mentioned priority relationships also ensure that low-priority write transaction requests are assigned a higher priority than low-priority read transaction requests. This serves to improve graphics device performance since graphics device functional units generally can determine in advance that a low-priority read transaction will need to be performed, and can plan on some latency when issuing a low-priority read request. On the other hand, when a graphics device needs to perform a low-priority write transaction, it is generally desirable to complete the transaction as quickly as possible.

Figure 3:
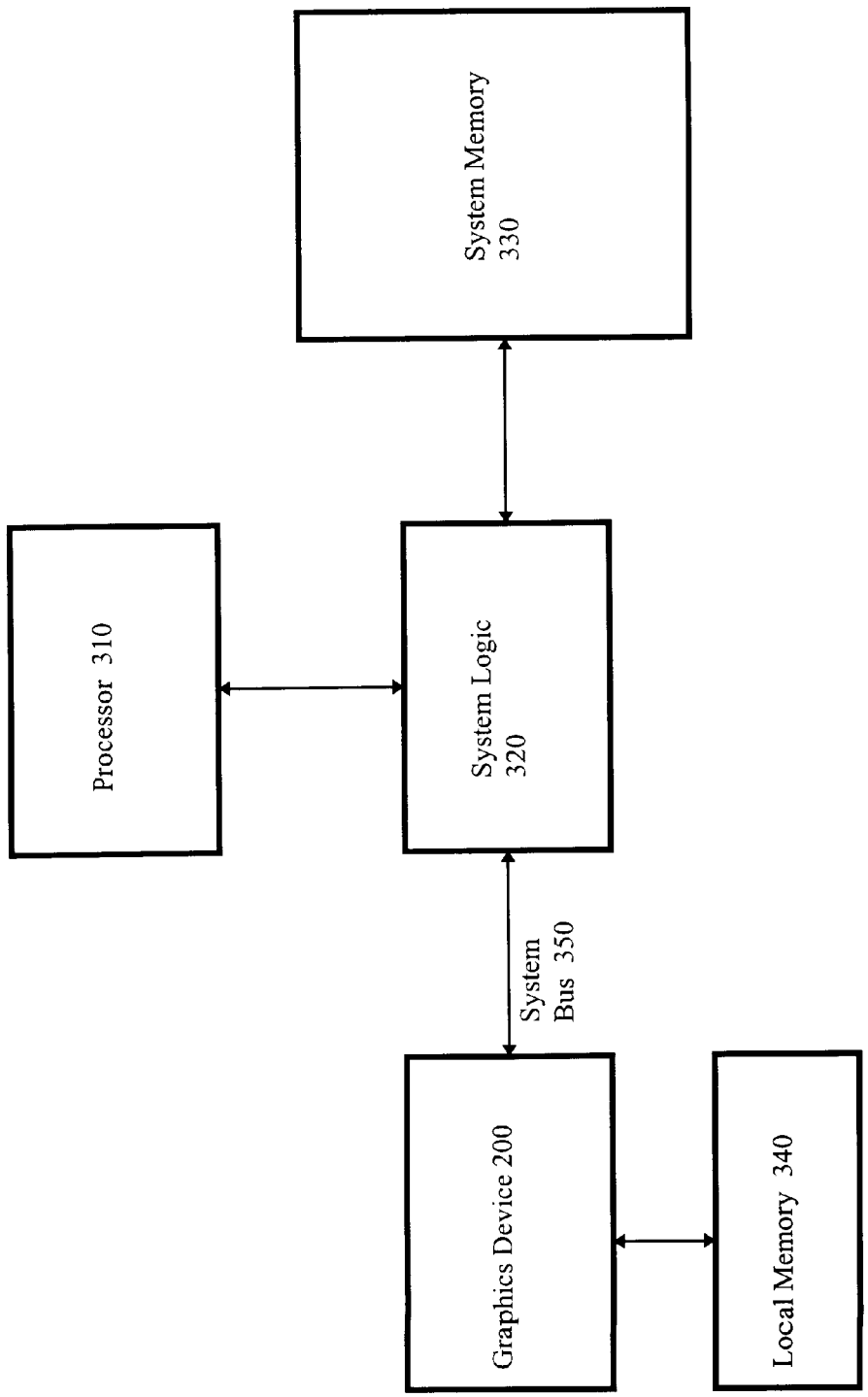

FIG. 3 illustrates an example computer system including the graphics device 200 as discussed above in connection with FIG. 2 and implemented in accordance with one embodiment of the invention. The example computer system includes a processor 310, a system logic device 320, a system memory 330, a system bus 350, the graphics device 200, and a local memory 340.

The processor 310 may be an 80960, 386, 486, Pentium® processor, Pentium® Pro processor, or Pentium® II processor made by Intel Corp., among others, including processors that are compatible with those listed above. The system memory 330 may include a random access memory (RAM) to store dynamic information for processor 310.

The system logic 320 is intended to represent a broad range of system logic devices, and may include a system memory controller and a system bus bridge and controller. The system logic 320 is coupled to the processor 310, the system memory 330, and is further coupled to the graphics device 200 via the system bus 350.

Processor transactions involving the local memory 340 pass through the system logic 320 then over the system bus 350. The transactions are processed by the graphics device 200 as described above in connection with FIG. 2.

Figure 4:
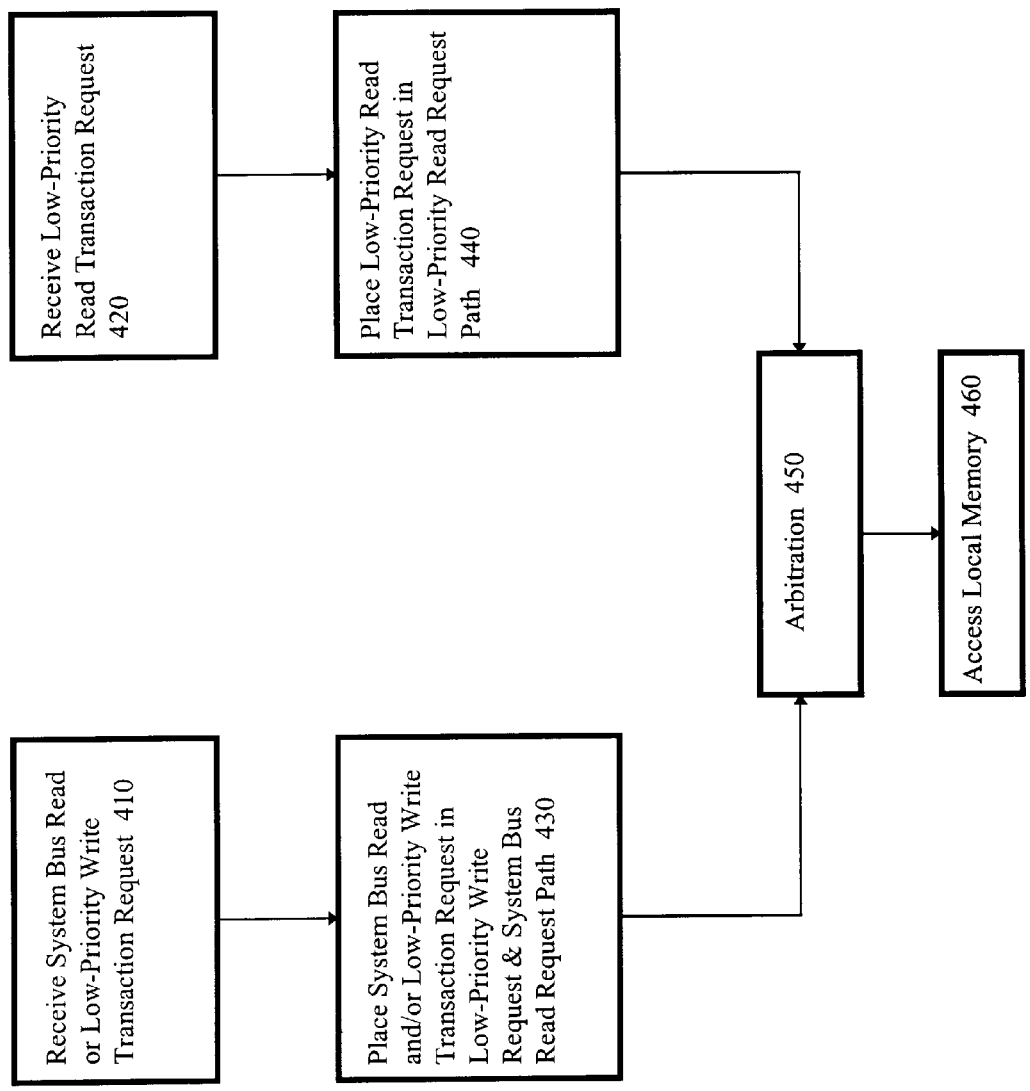

FIG. 4 is a flow diagram of a method for improving processor to graphics device local memory performance implemented in accordance with one embodiment of the invention. A read transaction request received over a system bus or a low-priority write request from a functional unit internal to a graphics device is received at step 410. The system bus read transaction request or a low-priority write request is placed in a low-priority write request and system bus read request path for temporary storage at step 430.

A low-priority read transaction request generated by a functional unit internal to the graphics device is received at step 420. The low-priority read request is placed in a low-priority read request path at step 440. Steps 420 and 440 may occur concurrently with corresponding steps 410 and 430.

Following steps 430 and 440, an arbitration process occurs at step 450. The arbitration process determines which transaction request from the a low-priority write request and system bus read request path and the low-priority read request path is to be the first to be forwarded on to access local memory at step 460. The transactions placed in the low-priority write request and system bus read request path are granted higher priority in the arbitration process than the transactions placed in the low-priority read request path. This priority arrangement ensures that read requests received over the system bus are granted higher priority than read requests generated by functional units internal to the graphics device, thereby improving processor bus to local memory performance.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A graphics device, comprising:
    a first request path to a local memory interface for low-priority read transactions, the low priority read transactions including read transactions from a blitting engine;
    a second request path to the local memory interface for low-priority write transactions and also for read transactions received over a system bus, the low priority write transactions including write transactions from the blitting engine; and
    an arbiter that arbitrates between the first request path and the second request path, the second request path having a higher priority than the first request path.

2. The graphics device of claim 1 wherein the first request path is used for read transactions generated by a rendering engine.

3. The graphics device of claim 1 wherein the second request path is used for write transactions generated by a rendering engine.

4. The graphics device of claim 1 further comprising a third request path to the local memory interface for high-priority read and write transactions and wherein the arbiter arbitrates between the first, second, and third request paths, the third request path having a higher priority than the second and first request paths and the second request path having a higher priority than the first request path.

5. The graphics device of claim 4 wherein the third request path is used for transactions generated by a display engine.

6. The graphics device of claim 4 further comprising:
    a buffered return path for returning information associated with the low-priority read transactions from the local memory interface; and
    an unbuffered return path for returning information associated with the high-priority read transactions from the local memory interface.

7. The graphics device of claim 6 wherein the unbuffered return path is used for returning information associated with the read transactions received over the system bus.

8. The graphics device of claim 6 wherein the buffered return path is used for returning information associated with read transactions generated by a rendering engine and further wherein the unbuffered return path is used for returning information associated with read transactions generated by a display engine.

9. The graphics device of claim 1 further comprising a read buffer that services read transactions received over the system bus.

10. The graphics device of claim 9 wherein the read buffer stores information that has been fetched from memory in response to previous read transactions.

11. A method for requesting access to a local memory associated with a graphics device, the method comprising:
    receiving a low-priority read transaction request over a first request path to a local memory interface, the low priority read transaction request including a read transaction request from a blitter engine;
    receiving a read transaction request from a system bus over a second request path to the local memory interface;
    providing a read buffer for servicing the read transaction received over the system bus, the read buffer to store data prefetched from the local memory in response to a previous read request received over the system bus;
    receiving a low-priority write transaction request over the second request path the low priority write transaction request including a write transaction from a blitter engine; and
    arbitrating between the first request path and the second request path, the second request path having a higher priority than the first request path.

12. The method of claim 11 wherein receiving a low-priority write transaction request over the second request path further includes receiving a write transaction request generated by a rendering engine.

13. The method of claim 11 wherein receiving a low-priority read transaction request includes receiving a read transaction request generated by a rendering engine.

14. The method of claim 11 further comprising the step of providing a third request path to the local memory interface for high-priority read and high-priority write transactions and wherein the step of arbitrating further includes arbitrating between the first, second, and third request paths, the third request path having a higher priority than the second and first request paths and the second request path having a higher priority than the first request path.

15. The method of claim 14 wherein the step of providing a third request path includes providing the third request path for handling transactions generated by a display engine.

16. A computer system, comprising:
 a processor coupled to a system bus;
 a memory device coupled to the system bus;
 a local memory coupled to the graphics device; and
 a graphics device coupled to the system bus, the graphics device including
  a first request path to a local memory interface for low-priority read transactions, the low priority read transactions including read transaction from a blitter engine,
  a second request path to the local memory interface for low-priority write transactions and also for read transactions received over the system bus, the low priority write transactions including write transactions from a blitter engine, and
  an arbiter that arbitrates between the first request path and the second request path, the second request path having a higher priority than the first request path.

17. The computer system of claim 16 wherein the graphics device further includes a buffered return path for returning information associated with the low-priority read transactions from the local memory interface and an unbuffered return path for returning information associated with the read transactions received over a system bus from the local memory interface.

* * * * *

UNITED STATES PATENT AND TRADEMARK OFFICE
CERTIFICATE OF CORRECTION

PATENT NO. : 6,091,431
DATED : July 18, 2000
INVENTOR(S) : Saxena et al.

It is certified that error appears in the above-identified patent and that said Letters Patent is hereby corrected as shown below:

Column 2,
Between line 21 and line 22, insert -- BRIEF DESCRIPTION OF THE DRAWINGS
    Figure 1 shows a block diagram of a low-priority read request path and a low-priority write request and system bus read request path implemented in accordance with one embodiment of the invention.
    Figure 2 depicts a graphics device implemented in accordance with one embodiment of the invention.
    Figure 3 illustrates a computer system including a graphics device implemented in accordance with one embodiment of the invention.
    Figure 4 is a flow diagram of a method for improving processor to graphics device local memory performace implemented in accordance with one embodiment of the invention. --

Signed and Sealed this

Seventeenth Day of December, 2002

JAMES E. ROGAN
*Director of the United States Patent and Trademark Office*